United States Patent [19]
Dernedde et al.

[11] 4,398,867
[45] Aug. 16, 1983

[54] CENTRIFUGAL PUMP CASING

[75] Inventors: Robert Dernedde, Frankenthal; Hans-Joachim Franke, Grünstadt; Peter Havekost, Bobenheim, all of Fed. Rep. of Germany

[73] Assignee: Klein, Schanzlin & Becker AG, Frankenthal, Fed. Rep. of Germany

[21] Appl. No.: 192,441

[22] Filed: Sep. 30, 1980

[30] Foreign Application Priority Data

Oct. 3, 1979 [DE] Fed. Rep. of Germany ....... 2940029

[51] Int. Cl.$^3$ .................... F01D 1/00; F01D 25/24; F04D 29/40
[52] U.S. Cl. .................... 415/219 C; 415/219 R
[58] Field of Search ........... 415/219 R, 219 A, 219 B, 415/219 C, 108, 136, 138, 139; 248/DIG. 1, 646, 571; 29/156.4 R, 156.4 WL, 156.61, 156.63

[56] References Cited

U.S. PATENT DOCUMENTS

| 2,144,417 | 1/1939 | Schneible | 415/219 B |
| 3,544,232 | 12/1970 | Zerlauth | 415/219 R |
| 3,628,884 | 12/1971 | Mierley | 415/219 R |
| 3,659,956 | 5/1972 | Brinkman | 415/219 C |

FOREIGN PATENT DOCUMENTS 2114642 11/1970 France .............. 415/219 R

Primary Examiner—Philip R. Coe
Assistant Examiner—Timothy F. Simone
Attorney, Agent, or Firm—Kontler, Grimes & Battersby

[57] ABSTRACT

The casing of a centrifugal pump has a shell with a cylindrical periphery having one or more recessed facets with flat or spherical surfaces which are welded to end portions of pipes by circumferentially complete machine-made seams each of which is intersected, in its entirety, by at least one imaginary plane that is normal to the axis of the respective pipe. This renders it possible to use automatic welding equipment and to readily inspect the quality of the connection between the shell and a pipe. The surface of the facet can be formed with a circumferentially complete groove to receive a transducer serving to generate signals denoting the intensity of penetrative radiation which has penetrated through the seam from a source of such radiation in the interior of the respective pipe and in register with the respective seam. The shell is suspended on the arms of a foundation and such arms extend into additional facets which are recessed into the periphery of the shell. The additional facets are bounded by such surfaces or are dimensioned in such a way that the shell can move relative to the foundation and/or vice versa in response to the application of thermally induced or pressure-induced stresses, for example, in response to heating or cooling when the heat expansion coefficient of the material of the shell is different from that of the material of the arms of the foundation.

18 Claims, 4 Drawing Figures

CENTRIFUGAL PUMP CASING

BACKGROUND OF THE INVENTION

The present invention relates to centrifugal pumps in general, and more particularly to improvements in centrifugal pumps of the type wherein the casing embodies a shell having a cylindrical or substantially cylindrical periphery, especially a shell which is a forging.

It is already known to employ casings which embody cylindrical shells in high pressure centrifugal pumps. As a rule, a centrifugal pump will be classified as a high pressure pump if its nominal total head is between 200 and 1200 meters. Such pumps can be used with advantage in pressure boosting as well as in many other plants. For example, high pressure centrifugal pumps find frequent use in power plants as well as (and especially) in many types of nuclear reactor plants. In such plants, the safety regulations are extremely stringent so that each and every component of the pump must be tested with a high degree of accuracy and must meet high standards prior to acceptance by the persons in charge. In many instances, testing involves resort to sources of ultrasonic radiation and/or penetrative radiation (e.g., X-ray equipment). The examination embraces all or nearly all components of a high pressure centrifugal pump, especially welded seams and those parts (such as the piping and casing) which must stand pronounced pressures for extended periods of time.

Presently known centrifugal pumps wherein the casings or housings embody cylindrical or substantially cylindrical shells surrounding one or more stages and having inlet and outlet means for conveyed fluid media exhibit a number of serious drawbacks. If the shell is to be welded to a tubular element (e.g., a pipe which is to constitute the inlet or the outlet) in a simple and convenient way (such as by resorting to a ring-shaped welded seam which connects a flat end face of the pipe to a similarly flat surface of the shell), the latter must be subjected to a number of complex machining operations in order to provide its periphery with one or more outwardly extending tubular nipples having flat end faces for abutment against the end faces of pipes prior to start of the welding operation. The cost of forged nipples is often prohibitive so that such technique failed to meet widespread acceptance in the industry.

Another serious drawback of many presently known centrifugal pump casings with cylindrical shells is that, if the aforediscussed nipples are to be omitted, the making of a welded seam between the end face of a tube and the cylindrical periphery of the shell involves extensive manual work and the quality of the resulting welded seams (which resemble distorted ellipses) is inferior (or normally inferior) to that of machine-made ring-shaped welded seams between two flat or nearly flat surfaces. Moreover, the testing of welded seams which are not flat rings is difficult, unreliable and time-consuming.

A further drawback of conventional centrifugal pumps having casings which embody cylindrical shells constituting one-piece forgings is that such forgings cannot be readily attached to conventional foundations or supports except by resorting to additional welded seams (each of which necessitates complex examination prior to acceptance of the pump) and/or to bolts, screws or analogous threaded fasteners which do not permit for any movement of the foundation relative to the shell and/or vice versa. Such drawbacks arise regardless of the nature of the foundation, i.e., regardless of whether the shell is secured to two or more arms of a foundation or is welded to brackets which are welded to the base plate of the foundation.

OBJECTS AND SUMMARY OF THE INVENTION

An object of the invention is to provide a novel and improved centrifugal pump casing which can be readily bonded to tubular or like elements by resorting to simple seams capable of being tested by resorting to available equipment.

Another object of the invention is to provide a casing which can be used with advantage in all or nearly all types of high pressure centrifugal pumps and which allows for requisite movements of the shell relative to the foundation and/or vice versa without adversely affecting the reliability of the support for the casing.

A further object of the invention is to provide a casing which can be reliably tested within a fraction of the time that is necessary for thorough testing of aforementioned conventional casings.

An additional object of the invention is to provide a centrifugal pump casing with a novel and improved cylindrical shell.

Another object of the invention is to provide a centrifugal pump casing which is simple and inexpensive, wherein the shell need not be formed with forged nipples in order to simplify the attachment of one or more pipes, and which can be used as a superior substitute for conventional casings of centrifugal pumps which are employed in power plants, nuclear reactor plants and like institutions.

A further object of the invention is to provide a centrifugal pump casing wherein the welded seam between a cylindrical forging which constitutes the shell of the casing and a tubular element can be tested with a higher degree of reliability than in heretofore known casings.

Another object of the invention is to provide a casing wherein the pipe or pipes can be welded to the cylindrical shell by resorting to simple and commercially available automatic or semiautomatic welding machines.

The invention is embodied in a centrifugal pump casing which comprises a shell having a substantially cylindrical periphery which is provided with at least one facet (preferably a recessed facet), a tubular element (e.g., a piece of pipe which may constitute an inlet for admission of fluid into or an outlet for evacuation of fluid from the casing) having an end portion adjacent to the facet, and a circumferentially complete welded seam connecting the end portion of the tubular element to the shell. Each portion of the welded seam is intersected by at least one imaginary plane which is normal to the axis of the tubular element. Otherwise stated, the welded seam is an annulus which is not deformed, as considered in the axial direction of the tubular element, so that it can be readily formed by resorting to available automatic welding equipment. This is in contrast to welding of pipe ends to unfacetted cylindrical peripheral surfaces of shells; such operation involves imparting to one end face of the pipe a concave shape to complement the cylindrical periphery of the shell and thereupon forming a welded seam which follows the outline of the concave end face of the pipe. The outline resembles a deformed ellipse, i.e., it is a body resembling a rubber ring which is placed around a tube that extends through and radially of a cylindrical body and which is thereupon deformed so that, while surrounding the tube, the ring also contacts the periphery of the cylindrical body.

The shell is or preferably constitutes a forging, and the facet is preferably provided with a flat or spherical surface which is adjacent to the end portion of the tubular element and is bonded to such end portion by the welded seam. The passages of the tubular element and the shell communicate with each other by way of a bore which is drilled or otherwise machined into and extends substantially radially of the shell. If the facet is recessed into the periphery of the shell, i.e., if the facet constitutes the bottom surface in a depression or recess machined into the periphery of the shell by resorting to a material deforming (e.g., forging) or a material removing technique, the diameter of the recess preferably exceeds the outer diameter of the tubular element so as to establish a circumferentially complete clearance between the exterior of the end portion of the tubular element and the adjacent (normally cylindrical) surface which surrounds the recess in the periphery of the shell.

The aforementioned flat or spherical surface of the facet can be provided with a circumferentially complete groove which surrounds the end portion of the tubular element and the seam so that the latter can be readily inspected by available testing equipment, for example, by placing a source of penetrative radiation into the interior of the tubular element in the region of the seam and by inserting a trandsducer into the groove so that the transducer is exposed to radiation which has penetrated through the seam. The groove can be machined in the same way as the facet, i.e., by resort to a material removing or to a material deforming technique.

The periphery of the shell can be formed with several additional facets which receive portions of a conventional or specially designed foundation so that such portions of the foundation support the shell. The portions of the foundation can extend into additional facets which are recessed and such additional facets can be or are bounded, at least in part, by surfaces which allow pressure- and/or heat-induced movements of the shell and foundation relative to each other. For example, each recessed additional facet may extend radially of the shell or each such additional facet can be bounded by a first surface which is substantially radial and a second surface which is substantially tangential to the shell. The portions of the foundation can extend into the additional (recessed) facets with at least some clearance, again for the purpose of allowing (when necessary) for some movement of the shell relative to the foundation and/or vice versa, e.g., when the aggregate is heated or cooled and the heat expansion coefficient of the material of the shell is different from that of the material of the foundation.

The novel features which are considered as characteristic of the invention are set forth in particular in the appended claims. The improved casing itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
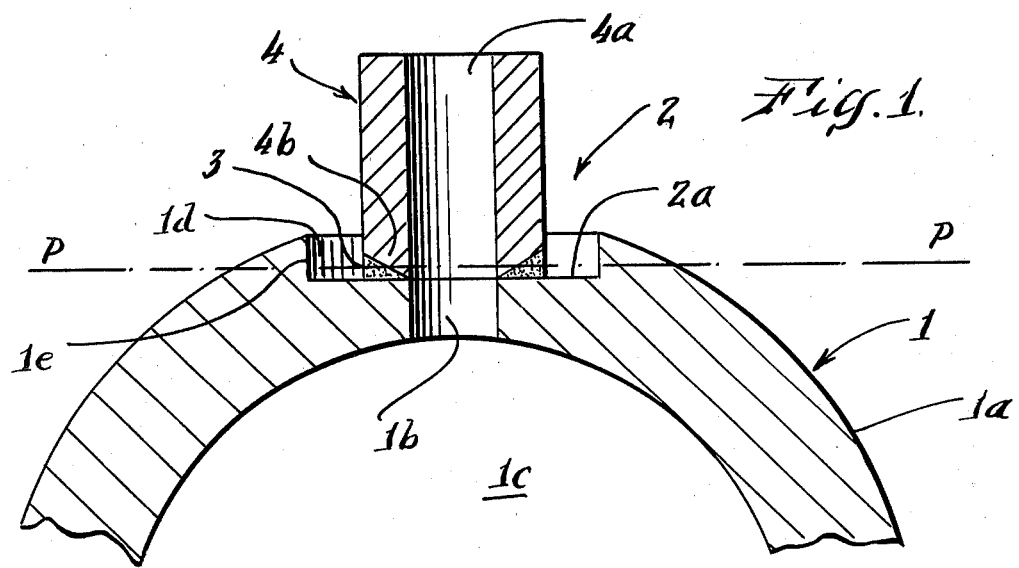
FIG. 1 is a fragmentary transverse sectional view of a casing which embodies one form of the invention and wherein the periphery of the shell has a recessed facet provided with a flat surface which is welded to the adjacent end portion of a tubular element.

Referring first to FIG. 1, there is shown a portion of a casing for a centrifugal pump, for example, a centrifugal pump for delivery of highly pressurized hydraulic fluids in power plants, nuclear reactor plants or similar institutions. The shell 1 of the casing is a metallic cylinder (preferably a one-piece forging) having a cylindrical periphery 1a and a radially extending bore 1b which connects the axial passage 1c of the shell with the axial passage 4a of a tubular element 4, e.g., a metallic pipe. The end portion 4b of the tubular element 4 (hereinafter called pipe for short) is permanently secured to the shell 1 by a circumferentially complete welded seam 3 disposed in a recessed facet 2 machined or otherwise formed in the periphery 1a of the shell 1. The illustrated facet 2 is or includes a flat surface 2a in the bottom zone of a shallow recess 1d in the periphery 1a. The recess 1d is machined from the material of the shell 1 and is bounded by a cylindrical surface 1e which is spaced apart from the end portion 4b so that the end portion 4b and the surface 1e define a circumferentially complete clearance surrounding the welded seam 3 and allowing for insertion of a portion of suitable testing equipment which is used to examine the seam 3 and the adjacent regions of the tubular element 4 and shell 1 for the presence of leaks and/or other defects. The recess 1d can be formed simultaneously with the bore 1b, e.g., by resort to suitable material removing machinery. Alternatively, the facet 2 can be formed by forging, i.e., by resorting to a material deforming technique.

In accordance with a feature of the invention, at least one imaginary plane (shown at P—P) which is normal to the axis of the pipe 4 intersects each and every portion of the welded seam 3. Otherwise stated, the center of gravity of each increment of the seam 3, as considered in the circumferential direction of the pipe 4, is located in one and the same plane. This renders it possible to employ commercially available welding equipment for bonding of the pipe 4 to the shell 1. Consequently, and since the seam 3 need not be formed by resorting to manually held torches or the like, its quality is much more uniform and hence superior to that of welded seams which must be formed by hand. As shown, the thickness of the shell 1 can greatly exceed the wall thickness of the pipe 4. The customary component parts of the centrifugal pump which embodies the casing of FIG. 1 are not shown because their construction and/or mounting in the shell 1 forms no part of the invention. The pipe 4 can serve for admission of nonpressurized fluid into the range of one or more impellers (depending on the number of pump stages) or for evacuation of pressurized fluid from the interior of the casing.

Figure 2:
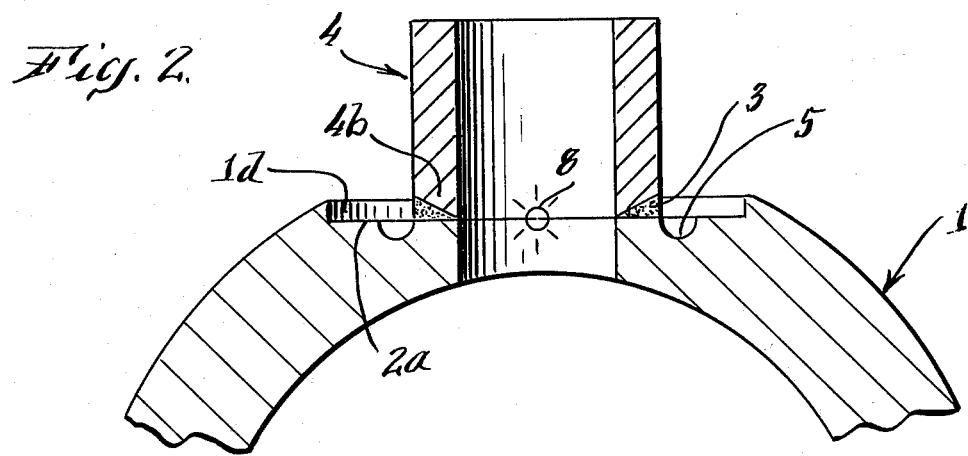
FIG. 2 is a fragementary transverse sectional view of a second casing wherein the surface of the recessed facet has a circumferentially complete groove surrounding the welded seam, and further showing a source of penetrative radiation in the interior of the tubular element at the level of the welded seam.

FIG. 2 shows a portion of a modified casing wherein the surface 2a in the deepest region of the recess 1d is formed with a circumferentially complete groove 5 for reception of one or more components of a testing apparatus which is used to inspect the quality of the welded seam 3. The reference character 8 denotes a source of penetrative radiation (e.g., a source of corpuscular radiation or a source of X-rays) which is placed into the end portion 4b of the pipe 4 to emit radiation that penetrates through the seam 3 and/or the adjacent portions of the shell 1 and pipe 4. The groove 5 can receive a transducer or other means (e.g., an X-ray film) that can record or otherwise ascertain the extent of absorption of radiation during penetration through the seam 3. Such means may include X-ray film in the groove 5 or a suitable transducer (e.g., an ionization chamber). The details of the testing equipment form no part of the invention; however, such equipment can be used with a minimum of effort and without appreciable modifications or adaptations due to the fact that the welded seam 3 is a simple annulus which is not distorted, as considered in the axial direction of the pipe 4, because it is adjacent to a flat surface 2a in the bottom zone of the recess 1d.

Figure 3:
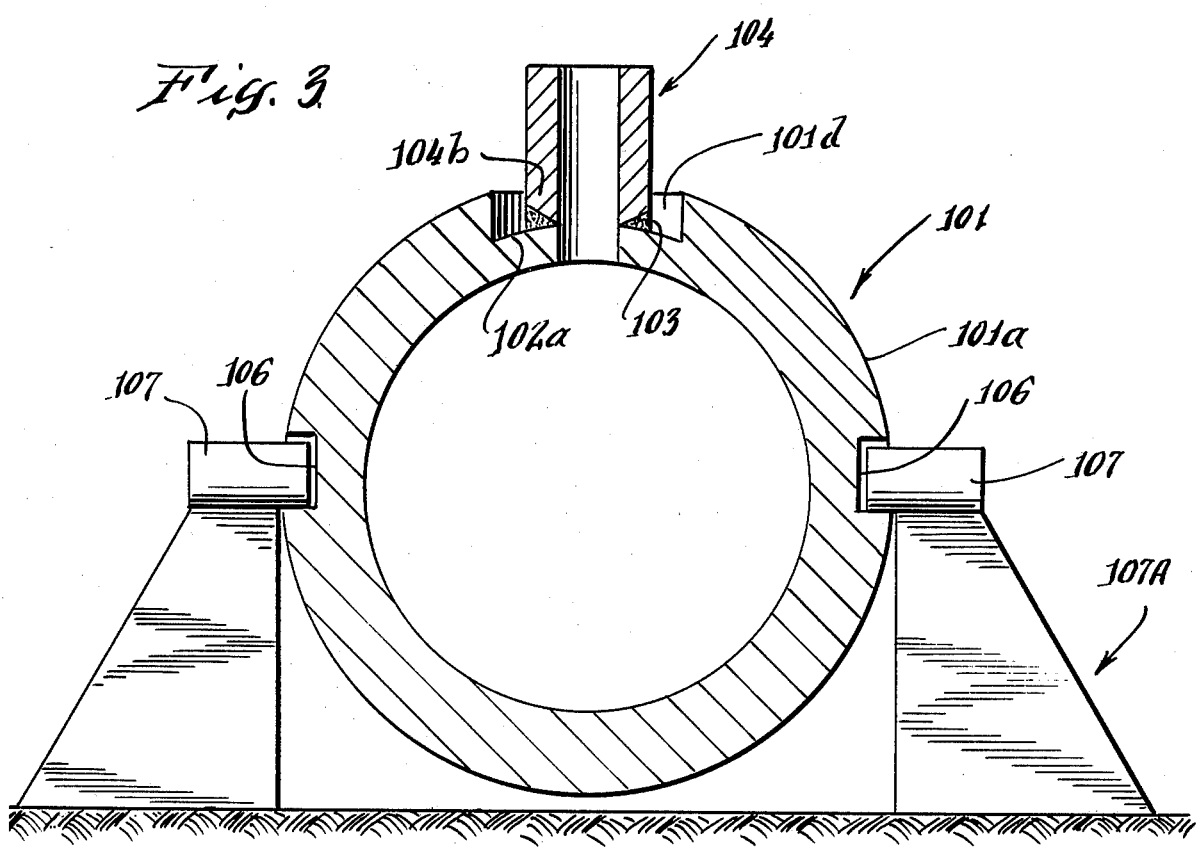
FIG. 3 is a transverse sectional view of a third embodiment wherein the recessed facet in the periphery of the shell has a spherical surface and further showing one mode of suspending the shell on a foundation.

FIG. 3 illustrates a casing having a shell 101 which is similar to the shell 1 of FIG. 1 or 2 except that the bottom surface 102a of its recess 101d is spherical. In spite of such configuration of the surface 102a, the end portion 104b of the pipe 104 is bonded to the shell 101 by a circumferentially complete annular or ring-shaped welded seam 103 which also allows for convenient testing by equipment of the type discussed in connection with FIG. 2. At least one imaginary flat plane which is normal to the axis of the pipe 104 intersects the entire seam 103.

The periphery 101a of the shell 101 of FIG. 3 is further formed with two additional recessed facets 106 which extend radially of the shell and are disposed diametrically opposite each other. The facets 106 directly receive portions 107 of a foundation 107A so that the portions 107 (e.g., elongated arms extending at right angles to the plane of FIG. 3) can readily support the shell 101. The arms or portions 107 are received in the facets 106 with at least some clearance so as to allow for relative movement between the shell 101 and foundation 107A, e.g., in response to stresses which develop as a result of heating when the heat expansion coefficient of the material of the shell 101 is different from that of the material of the arms 107. The foundation 107A may be of any conventional design and the provision of additional facets 106 renders it possible to properly support and directly suspend the casing without resort to additional welded seams or to screws, bolts or analogous threaded fasteners which provide relatively weak and often unsatisfactory connections between the foundation and the casing. Furthermore, welded seams and/or fasteners are much less likely to permit movements of the shell 101 relative to the arms 107 or vice versa.

Figure 4:
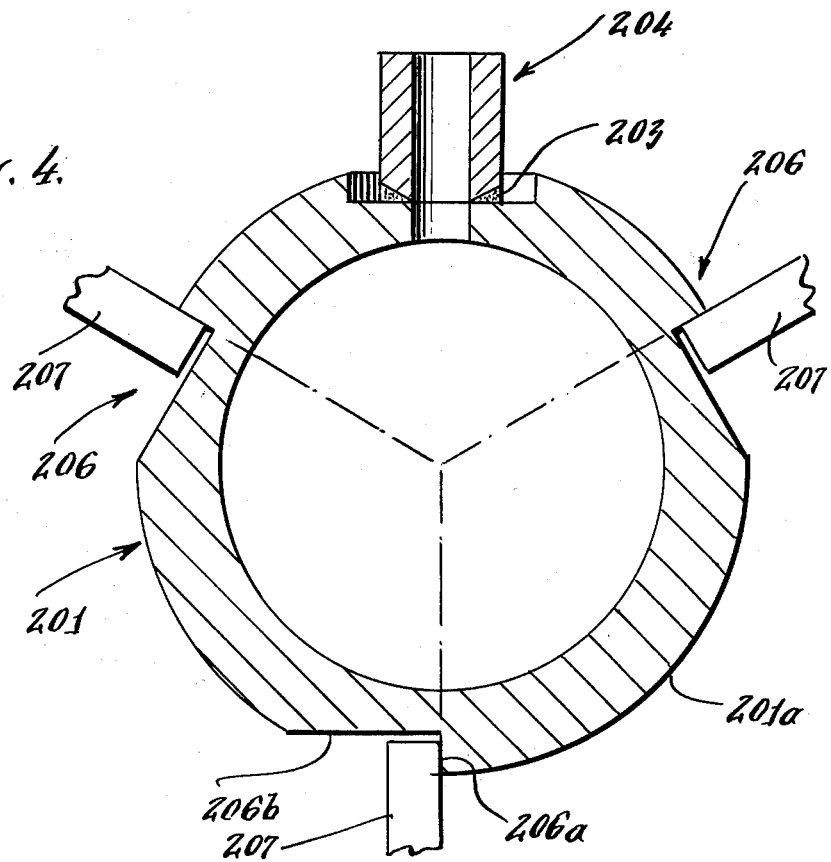
FIG. 4 is a similar transverse sectional view but showing modified additional facets for the supporting portions of the foundation.

FIG. 4 shows a casing including a shell 201 which is connected with a pipe 204 in the same way as described in connection with FIG. 1, i.e., by a welded seam 203 which is a flat ring and each portion of which is intersected by at least one imaginary plane making a right angle with the axis of the pipe 204.

The foundation includes several portions or arms 207 which extend into differently configured additional recessed facets 206 in the periphery 201a of the shell 201. Each additional facet 206 is bounded in part by a radial surface 206a and by a surface 206b which extends tangentially of the shell 201. Such design of the additional facets 206 also permits for at least some movement of the foundation (arms 207) relative to the shell 201 and/or vice versa. The arrangement of FIG. 4 is especially suited when the pump including the casing embodying the shell 201 is used to convey very cold or very hot fluids. The arms 207 also permit for at least some angular displacement of the shell 201 about its own axis.

In many presently known centrifugal pumps, the arms or legs of the foundation are welded or bolted to the shell of the pump casing. As mentioned above, the structures which are shown in FIGS. 3 and 4 can fully dispense with any welded or other more or less permanent connections, i.e., the shell 101 or 201 merely floats on the arms 107 or 207 so that it can readily move relative to the foundation and/or vice versa within limits which are necessary to ensure that the casing and the foundation can be made of materials which are best suited therefor even though the heat expansion coefficients of such materials can be widely different.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A pump casing, particularly a centrifugal pump casing, comprising:
    (a) a shell having an arcuate periphery and a first longitudinal axis, said periphery being provided with a facet;
    (b) a tubular element having an end face and a second longitudinal axis, said tubular element being arranged so that said end face confronts said facet and said second axis extends transversely of said first axis; and
    (c) a weld seam contacting said facet and connecting said tubular element to said shell, said seam extending in circumferential direction of said end face and being substantially complete in said direction, and said seam following a substantially planar path along said direction.

2. The casing of claim 1, wherein said shell is a forging.

3. The casing of claim 1, wherein said shell and said tubular element have axial passages and said shell has a substantially radial bore connecting said passages to each other.

4. The casing of claim 1, wherein said facet is recessed into said periphery of said shell.

5. The casing of claim 1, wherein said facet has a circumferentially complete groove surrounding said seam.

6. The casing of claim 5, wherein said facet and/or said groove therein is machined into the material of said shell.

7. The casing of claim 5, wherein said facet and/or said groove therein is forged into the material of said shell.

8. The casing of claim 1, wherein said periphery of said shell has several additional facets; and further comprising a foundation including portions cooperating with said additional facets to support said shell.

9. The casing of claim 8, wherein said additional facets are recessed into said periphery and extend substantially radially of said shell.

10. The casing of claim 9, wherein said portions of said foundation extend into the respective additional facets with at least some clearance to allow for movement of such portions and said shell relative to each other as a result of temperature changes.

11. The casing of claim 9, wherein each of said additional facets is bounded at least in part by surfaces which allow those portions of said shell which exhibit said facets to move relative to the respective portions of said foundation in response to the application of pressure- and/or temperature-induced stresses to said shell.

12. The casing of claim 11, wherein said surfaces bounding said additional facets include surfaces extending substantially radially of said shell.

13. The casing of claim 11, wherein said surfaces bounding said additional facets include surfaces extending substantially tangentially of said shell.

14. The casing of claim 1, wherein said facet is substantially flat.

15. The casing of claim 1, wherein said facet is substantially spherical.

16. The casing of claim 1, wherein said periphery is substantially cylindrical.

17. The casing of claim 16, wherein said second axis is substantially normal to said first axis.

18. The casing of claim 1, wherein said shell is a one-piece structure free of welds.

* * * * *